United States Patent [19]

Asai et al.

[11] Patent Number: 4,639,379
[45] Date of Patent: Jan. 27, 1987

[54] METHOD FOR THE IMPROVEMENT OF ANTISTATIC PERFORMANCE OF SYNTHETIC RESIN SHAPED ARTICLES

[75] Inventors: Michihiko Asai, Ibaraki; Yukio Shimura, Kanagawa; Keishiro Tsuda, Ibaraki; Susumu Ueno, Ibaraki; Hirokazu Nomura, Ibaraki; Kiyoshi Imada, Saitama, all of Japan

[73] Assignee: Shin-Etsu Chemical Co., Ltd., Tokyo, Japan

[21] Appl. No.: 743,874

[22] Filed: Jun. 11, 1985

Related U.S. Application Data

[63] Continuation of Ser. No. 441,935, Nov. 15, 1982, abandoned.

[30] Foreign Application Priority Data

Nov. 16, 1981 [JP] Japan ................. 56-183346

[51] Int. Cl.$^4$ .............................. B05D 3/06
[52] U.S. Cl. ........................ 427/40; 427/41; 427/248.1; 427/322
[58] Field of Search ............ 427/40, 41, 322, 248.1; 264/22, 83

[56] References Cited

U.S. PATENT DOCUMENTS

| | | | |
|---|---|---|---|
| 3,761,299 | 9/1973 | Lidel | 427/42 |
| 4,137,365 | 1/1979 | Fletcher et al. | 427/40 |
| 4,260,647 | 4/1981 | Wang et al. | 427/40 |
| 4,261,806 | 4/1981 | Asai et al. | 204/165 |
| 4,276,138 | 6/1981 | Asai et al. | 204/165 |

FOREIGN PATENT DOCUMENTS

| | | | |
|---|---|---|---|
| 50-107078 | 8/1975 | Japan | 427/40 |
| 53-8669 | 1/1978 | Japan | 427/40 |
| 56-161865 | 12/1981 | Japan | 427/40 |

Primary Examiner—Sadie L. Childs
Attorney, Agent, or Firm—Toren, McGeady and Goldberg

[57] ABSTRACT

The invention provides a very efficient method for the improvement of the antistatic performance, e.g. decrease in the accumulation of static electricity on the surface and decrease in the surface resistivity, of a synthetic resin shaped article with outstanding durability of the effect. The method comprises two steps in principle, first of which is the formation of a crosslinked layer in the surface portion of the shaped article by a variety of known methods effective for the formation of crosslinks in polymeric materials and the second of which is the exposure of the thus crosslinked surface of the article to low temperature plasma produced in an atmosphere containing a gaseous silicon-containing compound which may be a silane compound or a low-molecular weight vaporizable siloxane compound to form a plasma-polymerized surface film of the silicon compound on the crosslinked layer.

6 Claims, No Drawings

METHOD FOR THE IMPROVEMENT OF ANTISTATIC PERFORMANCE OF SYNTHETIC RESIN SHAPED ARTICLES

This is a continuation of application Ser. No. 441,935 filed Nov. 15, 1982, now abandoned.

BACKGROUND OF THE INVENTION

The present invention relates to a method for the improvement of the antistatic performance of a shaped article of a synthetic resin or, more particularly, to a method for the improvement of the antistatic performance, i.e. decreasing the surface resistivity and accumulation of static electricity on the surface of a shaped article of a synthetic resin by means of low temperature plasma treatment.

Shaped articles of various kinds of synthetic resins are widely used in a variety of fields not only as a general-purpose product but also for several specific applications because they are manufactured usually with high productivity and outstandingly low costs in addition to their excellent properties such as electric insulation. This desirable property of high electric insulation or, in particular, high surface resistivity, of synthetic resin shaped articles, however, causes several difficult problems due to the accumulation of static electricity on the surface as accompanied by the relatively small dielectric loss thereof. For example, the surface of synthetic resin shaped articles rapidly loses beautifulness in appearance by the deposition of dusts and dirts thereon. Human bodies coming into contact with an electrostatically charged surface of such a shaped article are badly influenced by receiving electric shocks and spark discharges between charged surfaces sometimes causes serious problems of disturbance, i.e. noise generation, in electronic circuits.

Therefore, it is a very important technical problem to develop a convenient and efficient method for the improvement of the antistatic performance of or for the decrease of the accumulation of static electricity on the surface of a synthetic resin shaped article. Various attempts have been made in the prior art in this regard. For example, a synthetic resin to be shaped is compounded with a sufficient amount of an electroconductive particulate material such as a metal powder or carbon black before molding into a shaped article. Surface resistivity of a synthetic resin shaped article can be decreased when provided with a very thin electroconductive film of a metal formed thereon by the techniques of sputtering, vapor deposition or other suitable method. Static electricity on the surface can be decreased by increasing the hydrophilicity of the surface by the use of a surface active agent as an antistatic agent which may be either incorporated into the body of the article by the admixture of the resin therewith prior to molding or applied by coating on the surface of the shaped article. Alternatively, introduction of hydrophilic groups or structure to the surface of a shaped article is also effective to decrease the static electricity as is obtained by a chemical treatment, e.g. acid etching, flame treatment, surface grafting by means of actinic rays such as electron beams, ultraviolet light, ionizing radiations and the like.

These prior art methods are indeed effective to some extent but never satisfactory due to the disadvantages of, for example, insufficient effectiveness in improving the antistatic performance, adverse effects on the characteristics of the shaped article in bulk if it be possible to impart sufficient antistatic performance, extremely high costs for the treatment and applicability of the method limited to relatively small articles or treatment in small quantities.

SUMMARY OF THE INVENTION

The object of the present invention is therefore to provide a convenient and efficient method for the improvement of the antistatic performance of a synthetic resin shaped article not suffering the problems unavoidable in the prior art methods with satisfactory durability of the effect and without any adverse influences on the characteristics of the shaped articles in bulk. In principle, the inventive method comprises the treatment of the surface of the shaped article with low temperature plasma.

The method of the present invention for the improvement of the antistatic performance of a synthetic resin shaped article, established as a result of the extensive investigations continued by the inventors with the above mentioned object, comprises the steps of (a) forming a crosslinked layer in at least the surface portion of a synthetic resin shaped article, and (b) exposing the surface of the shaped article thus provided with the crosslinked layer to low temperature plasma generated in an atmosphere containing a gaseous silicon compound represented by the general formula $$R_a H_b SiX_{4-a-b}, \quad (I)$$

in which R is a substituted or unsubstituted monovalent hydrocarbon group, X is a halogen atom or an alkoxy group, a is an integer of 0, 1, 2 or 3 and b is an integer of 0 or 1 with the proviso that a+b is not exceeding 3, or a hydrolysis-condensation product thereof to such an extent that a plasma-polymerized surface film of the said silicon compound having a thickness of at least 5 nm (nanometers) is formed in stratification on the crosslinked layer.

DETAILED DESCRIPTION OF THE PREFERRED EMBODIMENTS

The above described method of the present invention is versatile in respect of the type of the synthetic resin of which the shaped article to be treated by the method is formed including thermoplastic and thermosetting resins. Exemplary of the synthetic resins suitable for the inventive method are, for example, polyethylenes, polypropylenes, polystyrenes, saturated and unsaturated polyesters, cellulose acetates, polysulfones, polycarbonates, polyurethanes, polyimides, polyamides, i.e. various types of nylons, polyamidoimides, polyvinyl alcohols, acrylic resins, polyacetals, polyvinyl chlorides, copolymers of styrene and acrylonitrile, copolymers of styrene, acrylonitrile and butadiene, copolymers of ethylene and vinyl acetate, copolymers of vinylidene chloride and vinyl chloride, urea-formaldehyde resins, melamine-formaldehyde resins, phenol-formaldehyde resins, silicone resins, polyphenylene oxides, poly-p-xylenes, epoxy resins, diallyl phthalate resins and the like though not limited thereto. Block copolymers and graft copolymers as well as polymer blends based on these polymers are also suitable.

The shaped article is of course not necessarily formed of one or more of the above named synthetic resins alone but it is optional that the resin is compounded with various kinds of conventional additives and processing aids including, for example, plasticizers, stabilizers, lubricants, fillers, extenders, pigments, dyes, heat-resistance improvers, flame retardants, antioxidants, light absorbers, surface active agents, crosslinking agents, anti-fogging agents, dehumidifiers, elasticity-improvers and the like.

The method of shaping of the articles is also not limitative including casting, extrusion molding, injection molding, calendering, compression molding and the like techniques conventionally used in the fabrication of synthetic resin articles. The form of the shaped article is also not limitative provided uniform exposure of the surface to the low temperature plasma may be obtained. It is also optional that the shaped article is subjected to a desired pretreatment according to need such as heat treatment, stretching or drawing, crimping, crosslinking, sand blasting, corona discharge, solvent treatment, irradiation with an ionizing radiation and the like whereby the effectiveness of the inventive method is not affected.

The first step of the inventive method is the formation of a crosslinked layer in at least the surface portion of the shaped article by a suitable means of surface treatment. Various known methods are applicable to this object including irradiation with actinic rays such as ultraviolet light, electron beams, ionizing rdiation, e.g. gamma-rays, treatment with low temperature plasma generated by glow discharge or corona discharge, light irradiation of the shaped article impregnated in advance with a photosensitizer, crosslinking reaction between the polymer molecules and a crosslinking agent contained in the resin composition of the shaped article by incorporating prior to molding or by dipping of the shaped article therein, crosslinking reaction between the molecules of the polymeric resin per se having a crosslinkable structure or being provided with crosslinkable functional groups bonded to the backbone structure thereof, crosslinking by heating and the like. It is preferable that the surface layer of at least about 2 nm thickness of the shaped article is brought to the crosslinked state by the above mentioned crosslinking treatment.

The second step of the inventive method is the exposure of the surface thus provided with the crosslinked layer to the atmosphere of low temperature plasma of a specified gaseous constituent to form a plasma-polymerized surface film formed thereon in stratification with the crosslinked layer. The essential gaseous constituent of the plasma atmosphere is the silicon compound represented by the above given general formula (I) or a hydrolysis-condensation product thereof. In the general formula (I), the group denoted by the symbol R is a monovalent hydrocarbon group exemplified by alkyl groups such as methyl, ethyl, propyl and butyl groups, alkenyl groups such as vinyl and allyl groups, alkynyl groups such as ethynyl, propynyl and butynyl groups and aryl groups such as phenyl and naphthyl groups or a substituted monovalent hydrocarbon group by the partial or complete replacement of the hydrogen atoms in the above named hydrocarbon groups with other kinds of atoms such as halogen atoms or substituent groups such as cyano groups. The symbol X in the general formula (I) denotes a halogen atom such as chlorine, bromine and the like or an alkoxy group such as methoxy, ethoxy and butoxy groups. The symbols a and b are each an integer of 0 to 3 or 0 or 1, respectively, with the proviso that a+b is not exceeding 3 or, in other words, at least one atom or group denoted by X is bonded to the silicon atom in a molecule.

Particular examples of the silicon compounds in conformity with the general formula (I) include a diversity of compounds according to the kinds and combinations of the groups or atoms denoted by R and X as well as the values of the suffixes a and b. Exemplary of the silicon compounds represented by the formula $RHSiX_2$ are methyl dichlorosilane and the like, those represented by the formula $R_2HSiX$ are dimethyl chlorosilane, dimethyl methoxy silane and the like, those represented by the formula $R_3SiX$ are trimethyl chlorosilane, trimethyl methoxy silane, trimethyl ethoxy silane, vinyl dimethyl chlorosilane, vinyl dimethyl methoxy silane, vinyl dimethyl ethoxy silane, ethynyl dimethyl methoxy silane, ethynyl dimethyl chlorosilane, triethyl methoxy silane, dimethyl chloromethyl methoxy silane, dimethyl chloromethyl chlorosilane, dimethyl phenyl methoxy silane, 2-chloroethyl dimethyl chlorosilane, 2-chloroethyl dimethyl methoxy silane and the like, those represented by the formula $R_2SiX_2$ are methyl chloromethyl methoxy chlorosilane, dimethyl dichlorosilane, dimethyl dimethoxy silane, diethyl dimethoxy silane, dimethyl diethoxy silane, vinyl methyl dichlorosilane, vinyl methyl dimethoxy silane, 2-chloroethyl methyl dichlorosilane, vinyl methyl diethoxy silane, methyl chloromethyl dichlorosilane, methyl phenyl dimethoxy silane, methyl chloromethyl dimethoxy silane and the like, those represented by the formula $RSiX_3$ are methyl trimethoxy silane, methyl triethoxy silane, vinyl trichlorosilane, vinyl trimethoxy silane, vinyl triethoxy silane, phenyl trimethoxy silane, chloromethyl trimethoxy silane, 2-chloroethyl trimethoxy silane, 3-chloropropyl trimethoxy silane and the like and those represented by the formula $SiX_4$ are silicon tetrachloride, orthomethyl silicate, orthoethyl silicate and the like. In the above given exemplification, the halogen atom denoted by X is limited to chlorine but those silicon compounds having bromine or iodine atoms in place of the chlorine atoms are also suitable for the purpose.

In addition to the above named silicon compounds in which the group or groups denoted by R are all unsubstituted or halogen-substituted monovalent hydrocarbon groups, those organosilane compounds having one or more of monovalent hydrocarbon groups or alkoxy groups substituted with a reactive or functional group are also used in the inventive method. Several of the examples of such organosilane compounds, known to be useful as a so-called silane coupling agent in the resin and rubber processing technology, are vinyl tris(2-methoxyethoxy) silane, 3-glycidyloxypropyl trimethoxy silane, 3-methacryloxypropyl trimethoxy silane, N-(2-aminoethyl)-3-aminopropyl trimethoxy silane, N-(2-aminoethyl)-3-aminopropyl methyl dimethoxy silane, 3-mercaptopropyl trimethoxy silane, 3-aminopropyl triethoxy silane and the like.

As is mentioned before, the silicon compound as an essential constituent of the plasma atmosphere in the inventive method is not limited to the above named ones which belong to the class of organic or inorganic silane compounds but may be a hydrolysis-condensation product thereof obtained by the partial or complete hydrolysis of the silane compound followed by the partial or complete condensation reaction between the silanolic hydroxy groups formed by the hydrolysis to form one or more of siloxane linkages. Exemplary of such a siloxane compound are, for example, divinyl tetramethyl disiloxane, di(chloromethyl) tetramethyl disiloxane, diethynyl tetramethyl disiloxane, 1,1,3,3-tetramethyl disiloxane and the like disiloxane compounds although trisiloxanes and higher condensates may be used provided that the vapor pressure of the siloxane compound is sufficiently high to sustain the plasma discharge in the atmosphere which can take place only in an atmosphere of a pressure in a limited range as mentioned below.

The procedure for the low temperature plasma treatment of a shaped article per se is well known in the art. That is, the synthetic resin shaped article after completion of the step (a) treatment of crosslinking is brought into a plasma chamber provided with electrodes connected to an electric power source such as a high frequency generator and, after evacuation of the plasma chamber, the chamber is filled with a vapor or gas of the silicon compound to give a pressure of about 0.001 to 10 Torr followed by the supply of an electric power to the electrodes to generate low temperature plasma in the plasma chamber whereby the surface of the shaped article is exposed to the low temperature plasma while the gas of the silicon compound is continuously passed therethrough to control and maintain the pressure as above mentioned.

It is optional according to need that the gas or vapor of the silicon compound is diluted with other kinds of inorganic or organic gases including inert gases, e.g. helium and argon, nitrogen, oxygen, air, hydrogen, carbon monoxide and carbon dioxide as well as organic gases other than silicon-containing compounds.

As is mentioned above, the pressure inside the plasma chamber should preferably be kept in the range from 0.001 to 10 Torr. This is because the desired low temperature plasma cannot be generated with stability in the plasma chamber and hence no satisfactory effects of the plasma treatment can be obtained when the pressure inside the chamber is outside this range. More preferably, the pressure should be in the range from 0.05 to 1 Torr. It has been rather unexpected from the information obtained in the prior art plasma treatment or plasma polymerization that, even when the low temperature plasma treatment has been undertaken prolongedly, the effect of the treatment rapidly decreases and the surface resistivity of the synthetic resin article after plasma treatment increases as the pressure in the plasma atmosphere increses over 10 Torr.

The conditions for the generation of low temperature plasma in the plasma chamber are well known in the art so that no detailed explanation would be necessary here. In short, low temperature plasma can be generated in the plasma chamber when an electric power of at least several watts, preferably, at a high frequency range of several kHz to several hundreds of MHz is supplied to the electrodes positioned inside or outside the plasma chamber in which the pressure is kept as mentioned above. The type of the plasma discharge may be either glow discharge or corona discharge, regardless of which sufficient effects of improvement can be obtained in the surface properties of the thus treated shaped article. The time for the low temperature plasma treatment may widely differ depending on various factors including the type of the synthetic resin, electric power for the plasma generation, desired thickness of the plasma-polymerized film formed on the surface of the shaped article and so on.

It is essential that the plasma-polymerized film of the silicon compound formed on the surface of the shaped article in the above described manner should have a thickness of at least 5 nm. When the thickness is smaller than 5 nm, the antistatic performance of the thus plasma-treated shaped article is unsatisfactory. The upper limit of the thickness is, on the other hand, not particularly limitative provided that the characteristics of the shaped article in bulk are not adversely affected by the prolonged plasma treatment. In this connection, the low temperature plasma treatment of a duration in which the thickness of the plasma-polymerized surface film has a thickness of 1000 nm or smaller can be performed safely without the above mentioned adverse effects. At any rate, an excessively large thickness of the plasma-polymerized surface film should be avoided in order to have good productivity of the process since the effectiveness of the inventive method does not increase so much by the increase of the film thickness over an adequate range.

It should be mentioned that, in the low temperature plasma treatment in an atmosphere containing a silicon compound, two kinds or more of the silicon compounds may be used in combination whereby certain synergistic effect can be expected in some cases. It may be also advantageous in order to impart the shaped article with other desirable improved surface properties other than the antistatic performance to admix the silicon compound with one or more of other types of organic compounds and/or the above mentioned inorganic gases whereby, in addition to the very durable antistatic performance with decreased surface resistivity, the shaped article may be imparted with improved wettability, susceptibility to adhesive bonding, printability, antiwearing resistance, mold releasability, heat resistance, water resistance, resistance against migration of ingredients contained therein and so on.

When the plasma-polymerized surface film is formed in accordance with the above described procedure of the inventive method on the surface of the crosslinked layer of the synthetic resin shaped article, the thickness of the plasma-polymerized surface film is usually in the range from 5 to 1000 nm so that the appearance of the shaped article remains unchanged. Despite the seemingly unchanged appearance of the shaped article, the formation of the crosslinked layer and the plasma-polymerized surface layer can be confirmed by the following methods. For example, the crosslinked layer in the surface portion of the shaped article can be observed by the test of the gelled fraction insoluble in an organic solvent, by the examination of the changes in the heat resistance and mechanical properties such as tensile strength, impact strength and the like, by the measurement of the changes in the molecular weight of the resin by the gel permeation chromatography or measurement of the melt viscosity of the resin after treatment and by the method of the examination of decrease in the crystallinity of the resin by the techniques of X-ray diffractometry or infrared spectrophotometry. The formation of the plasma-polymerized surface film, on the other hand, can be confirmed by X-ray photoelectron spectrometry (ESCA) and reflective infrared spectrophotometry indicating that the surface film contains silicon atoms and silicon-to-carbon linkages. Alternatively, the treated shaped article is dyed with osmic acid and then a cross section of the thus dyed article is examined by use of a transmission-type electron microscope where the plasma-polymerized surface film is dyeable with osmic acid whereas the crosslinked layer remains undyed.

Following are the examples to illustrate the method of the present invention in further detail.

Experiment 1

A resin composition composed of 100 parts by weight of a polyvinyl chloride resin, 2 parts by weight of a barium- and zinc-containing stabilizer, 5 parts by weight of triallyl isocyanurate as a crosslinking agent and 0.5 parts by weight of dicumyl peroxide was milled in a hot roller mill at 160° C. for 10 minutes and shaped by compression molding with heating at 165° C. into a crosslinked polyvinyl chloride resin sheet having a thickness of 0.5 mm, which is referred to as sheet A hereinbelow.

Separately, another polyvinyl resin sheet having a thickness of 0.5 mm was prepared of a resin composition composed of 100 parts by weight of the same polyvinyl chloride resin as above and 2 parts by weight of the barium- and zinc-containing stabilizer alone by compression molding under the same conditions as above and the sheet was subjected to a low temperature plasma treatment for 10 minutes in a plasma chamber which was first evacuated to a vaouum of about $10^{-3}$ Torr followed by the introduction of vapor of aniline to keep the pressure inside the chamber at 0.3 Torr under continuous flow of the aniline vapor and supply of a high frequency electric power of 200 watts at a frequency of 13.56 MHz to the electrodes of the plasma chamber. The thus plasma-treated resin sheet is referred to as sheet B hereinbelow.

A portion of each of the above prepared sheets A and B was dipped and dissolved in tetrahydrofuran to determine the gel fraction insoluble in the solvent, from which formation of the crosslinked layer was confirmed.

In the next place, the sheets A and B were placed in a plasma chamber and subjected to a low temperature plasma-polymerization treatment for 1 minute by the supply of a high frequency electric power of 1 kilowatt at 13.56 MHz to the electrodes of the plasma chamber, which was first evacuated to a vacuum of $10^{-4}$ Torr followed by the introduction of the atmospheric air to keep the pressure of the inside of the chamber at 0.1 Torr with continuous flow of the air and then continuous introduction of vapor of chloromethyl dichlorosilane to be admixed with the flowing air so as to keep the partial pressures of the air and the silane in the chamber at 0.1 Torr and 1.2 Torr, respectively, during the plasma discharge. The resin sheets thus subjected to the plasma-polymerization treatment are referred to as sheets A* and B*, respectively, hereinbelow.

The sheets A* and B* were examined by the methods of X-ray photoelectron spectrometry and reflective infrared spectrophotometry to find that the formation of a plasma-polymerized layer of about 45 nm thickness on each of the sheets was confirmed by the presence of the silicon atoms and the silicon-to-carbon linkages.

The antistatic performance of each of the above sheets A, B, A* and B* was evaluated by the measurements of the distance of cigarette ash attraction, surface resistivity and electrostatic voltage induced by rubbing by the procedures described hereunder. The results of the measurements were as tabulated below.

|  | Distance of cigarette ash attraction, cm | Surface resistivity, ohm | Charge voltage by rubbing, volts |
| --- | --- | --- | --- |
| Sheet A* | 3 | $1 \times 10^{12}$ | 1600 |
| Sheet A | 6 | $7 \times 10^{14}$ | 7600 |
| Sheet B* | 0 | $3 \times 10^{8}$ | 200 |
| Sheet B | 6 | $7 \times 10^{14}$ | 7600 |

Distance of cigarette ash attraction: the resin sheet was rubbed 10 times with a dry cotton cloth to be charged with static electricity induced by rubbing and the thus charged resin sheet was brought toward a pile of cigarette ash in an atmosphere at 25° C. and with 60% relative humidity and the distance between the ash and the sheet at which the ash was first attracted to the sheet was recorded in cm.

Surface resistivity: measurement was performed in an atmosphere of 60% relative humidity by use of an instrument Model SM-10E manufactured by Toa Denpa Kogyo Co.

Charge voltage by rubbing: measurement was performed by use of a rotary static tester manufactured by Koa Shokai Co. using a cotton cloth for rubbing the resin sheet under a load of 200 g at 750 r.p.m. for 60 seconds.

Experiment 2

A resin sheet of 0.3 mm thickness was prepared of a resin composition composed of 100 parts by weight of a vinyl chloride resin and 50 parts by weight of dioctyl phthalate. This resin sheet was irradiated with ultraviolet light for 2 minutes in an atmosphere of reduced pressure of air at 10 Torr under a low-pressure mercury lamp of 300 watts output emitting line spectra at 185 nm, 254 nm, 313 nm and 365 nm held 5 cm apart above the sheet. The thus ultraviolet-irradiated resin sheet is referred to as sheet C hereinbelow.

In the next place, the sheet C was placed in a plasma chamber and subjected to a low temperature plasma-polymerization treatment for 30 seconds by the supply of a high frequency electric power of 2 kilowatts at 13.56 MHz to the electrodes of the plasma chamber, which was first evacuated to a vacuum of $10^{-3}$ Torr followed by the introduction of the atmospheric air to keep the pressure of the inside of the chamber at 0.05 Torr with continuous flow of the air and then continuous introduction of vapor of orthomethyl silicate to be admixed with the air so as to keep the partial pressures of the air and the silicon compound in the chamber at 0.05 Torr and 0.6 Torr, respectively, during the plasma discharge. The resin sheet thus subjected to the plasma-polymerization treatment is referred to as sheet C* hereinbelow.

This sheet C* was dyed with osmic acid and a section thereof was examined with a transmission-type electron microscope to find the presence of an undyed crosslinked layer of about 100 nm thickness in the surface portion of the sheet overlaid with a dyed layer of about 85 nm thickness which was a plasma-polymerized surface film of the silicon compound.

Each of the sheets C and C* was subjected to the test for the antistatic performance in the same manner as in Experiment 1 above to give the results shown below.

| | Distance of cigarette ash attraction, cm | Surface resistivity, ohm | Charge voltage by rubbing, volts |
|---|---|---|---|
| Sheet C* | 0 | $6 \times 10^8$ | 350 |
| Sheet C | 5 | $4 \times 10^{13}$ | 4200 |

Experiment 3

A low-density polyethylene film of 0.3 mm thickness obtained on the market, which is referred to as film D hereinbelow, was irradiated with electron beams of 2 MeV energy in a vacuumized atmosphere whereby to effect crosslinking between the polyethylene molecules at the surface portion. The thus surface-crosslinked resin film is referred to as film E hereinbelow.

On the other hand, another portion of the same polyethylene film was placed in a plasma chamber and subjected to the exposure to low temperature plasma produced in the chamber to effect crosslinking at the surface portion by the supply of a high frequency electric power of 100 watts at 13.56 MHz for 3 minutes to the electrodes of the plasma chamber, which was first evacuated to a vacuum of $10^{-4}$ Torr followed by the continuous introduction of helium so as to keep the pressure inside of the chamber at 0.5 Torr during the plasma discharge. The thus plasma-treated polyethylene film is referred to as film F hereinbelow. Each of the films E and F was dissolved in hot xylene to find precipitation of an insoluble gelled fraction indicating the crosslinking of the resin molecules.

Above prepared films E and F were placed in a plasma chamber and subjected to a low temperature plasm-polymerization treatment by the supply of a high frequency electric power of 10 kilowatts at 110 kHz for 20 seconds to the electrodes of the plasma chamber, which was first evacuated to a vacuum of $10^{-3}$ Torr followed by the continuous introduction of vapor of divinyl tetramethyl disiloxane so as to keep the pressure inside the chamber controlled at 0.5 Torr during the plasma discharge. The resin films thus subjected to the plasma-polymerization treatment are referred to as films E* and F*, respectively. The thickness of the plasma-polymerized surface films on the films E* and F* was about 15 nm as examined in the same manner as in Experiment 2.

Each of the films D, E, F, E* and F* was subjected to the test for the antistatic performance in the same manner as in Experiment 1 to give the results shown below

| | Distance of cigarette ash attraction, cm | Surface resistivity, ohm | Charge voltage by rubbing, volts |
|---|---|---|---|
| Film E* | 1 | $7 \times 10^9$ | 700 |
| Film E | 7 | $8 \times 10^{15}$ | 9500 |
| Film F* | 1 | $1 \times 10^{10}$ | 600 |
| Film F | 6 | $4 \times 10^{15}$ | 7700 |
| Film D | 6 | $6 \times 10^{15}$ | 8600 |

Experiment 4

A resin film of 0.5 mm thickness of a 85:15 by weight copolymer of vinylidene chloride and vinyl chloride obtained on the market, which is referred to as film G hereinbelow, was placed in a plasma chamber and subjected to exposure to low temperature plasma for 5 minutes to effect crosslinking of the surface portion by the supply of a high frequency electric power of 500 watts at 110 kHz to the electrodes of the plasma chamber, which was first evacuated to a vacuum of $10^{-3}$ Torr followed by the continuous introduction of nitrogen and argon so as to keep the partial pressures of nitrogen and argon at 0.2 Torr and 0.1 Torr, respectively, in the chamber during the plasma discharge. The thus plasma-cross-linked resin film is referred to as film H hereinbelow.

The film H was dyed with osmic acid and a section thereof was examined by use of a transmission-type electron microscope to find the presence of an undyed surface layer of about 200 nm thickness in the surface portion of the dyed resin film indicating the crosslink formation in the surface portion.

The film H in the plasma chamber was then subjected to the plasma-polymerization treatment for 5 minutes by the supply of a high frequency electric power of 200 watts at 13.56 MHz to the electrodes of the plasma chamber, which was first evacuated to a vacuum of $10^{-3}$ Torr followed by the continuous introduction of vapor of vinyl dimethyl methoxy silane so as to keep pressure inside the chamber at 0.05 Torr during the plasma discharge. The resin film thus subjected to the plasma-polymerization treatment is referred to as film H* hereinbelow. This film H* was examined with a transmission-type electron microscope after dyeing with osmic acid in the same manner as above to find the presence of a dyed surface film of about 200 nm thickness formed on the above mentioned undyed crosslinked layer.

Each of the films G, H and H* was subjected to the test for the antistatic performance in the same manner as in Experiment 1 to give the results shown below.

| | Distance of cigarette ash attraction, cm | Surface resistivity, ohm | Charge voltage by rubbing, volts |
|---|---|---|---|
| Film H* | 0 | $6 \times 10^8$ | 250 |
| Film H | 8 | $9 \times 10^{14}$ | 9600 |
| Film G | 8 | $9 \times 10^{14}$ | 9200 |

Experiment 5

A commercially available stretched resin film of polyethylene terephthalate having a thickness of about 0.3 mm, which is referred to as film I hereinbelow, was irradiated with gamma-rays from Co-60 in a radiation dose of about 10 Mrad to effect crosslinking of the resin. This irradiated resin film was dissolved in a solvent mixture of phenol and tetrachloroethylene to find precipitation of a considerable amount of insoluble gelled fraction indicating the formation of crosslinks. The thus crosslinked polyethylene terephthalate film is referred to as film J hereinbelow.

This film J was placed in a plasma chamber and subjected to the treatment of plasma-polymerization for 2 minutes by the supply of a high frequency electric power of 500 watts at 13.56 MHz to the electrodes of the plasma chamber, which was first evacuated to a vacuum of $10^{-3}$ Torr followed by the continuous introduction of vapor of trimethyl methoxy silane so as to keep the pressure of inside of the chamber at 0.6 Torr during the plasma discharge. The resin film thus subjected to the treatment of plasma polymerization is referred to as film J* hereinbelow.

The formation of a plasma-polymerized surface film on this film J* was confirmed by the X-ray photoelectron spectrometry and the reflective infrared spectrophotometry showing the presence of silicon atoms and silicon-to-carbon linkages in the surface film, which had a thickness of about 20 nm.

Each of the films I, J and J* was subjected to the test for the antistatic performance in the same manner as in Experiment 1 to give the results shown below.

|  | Distance of cigarette ash attraction, cm | Surface resistivity, ohm | Charge voltage by rubbing, volts |
| --- | --- | --- | --- |
| Film J* | 1 | $7 \times 10^9$ | 450 |
| Film J | 5 | $2 \times 10^{13}$ | 6000 |
| Film I | 6 | $1 \times 10^{14}$ | 6500 |

What is claimed is:

1. A method for improving the antistatic performance of a shaped article of a synthetic resin which comprises the steps of
   (a) forming a crosslinked layer in at least the surface portion of the shaped article, and
   (b) exposing the surface of the shaped article thus provided with the crosslinked layer to low temperature plasma generated in an atmosphere containing a gaseous silicon compound represented by the general formula $$R_a H_b SiX_{4-a-b},$$

in which R is a substituted or unsubstituted monovalent hydrocarbon group, X is a halogen atom or an alkoxy group, a is an integer of 0, 1, 2 or 3 and b is an integer of 0 or 1 with the proviso that a+b is not exceeding 3, or a hydrolysis-condensation product thereof, to form a plasma-polymerized surface film of the silicon compound having a thickness of at least 5 nm on the surface of the shaped article.

2. The method as claimed in claim 1 wherein the thickness of the crosslinked layer is at least 2 nm.

3. The method as claimed in claim 1 wherein the unsubstituted monovalent hydrocarbon group denoted by R is selected from the class consisting of alkyl groups, alkenyl groups, alkynyl groups and aryl groups.

4. The method as claimed in claim 1 wherein the halogen atom denoted by X is a chlorine atom.

5. The method as claimed in claim 1 wherein the alkoxy group denoted by X is selected from the class consisting of methoxy, ethoxy and butoxy groups.

6. The method as claimed in claim 1 wherein the hydrolysis-condensation product of the silicon compound represented by the general formula is selected from the class consisting of divinyl tetramethyl disiloxane, di(chloromethyl) tetramethyl disiloxane, diethynyl tetramethyl disiloxane and 1,1,3,3-tetramethyl disiloxane.

* * * * *